United States Patent
Fujiwara

(10) Patent No.: US 8,589,113 B2
(45) Date of Patent: Nov. 19, 2013

(54) MOVEMENT DETECTION DEVICE, ELECTRONIC DEVICE, MOVEMENT DETECTION METHOD AND STORAGE MEDIUM STORED WITH A PROGRAM

(75) Inventor: Kazunori Fujiwara, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 249 days.

(21) Appl. No.: 12/861,274

(22) Filed: Aug. 23, 2010

(65) Prior Publication Data

US 2011/0054831 A1   Mar. 3, 2011

(30) Foreign Application Priority Data

Aug. 28, 2009 (JP) ................................ 2009-198296

(51) Int. Cl.
*G01P 15/00* (2006.01)
(52) U.S. Cl.
USPC .......................................................... 702/141
(58) Field of Classification Search
USPC ............................. 702/141, 153; 73/488, 486
See application file for complete search history.

(56) References Cited

U.S. PATENT DOCUMENTS

| 6,636,826 | B1 * | 10/2003 | Abe et al. ....................... 702/151 |
| 2010/0192662 | A1 * | 8/2010 | Yanni .............................. 73/1.38 |
| 2011/0025901 | A1 * | 2/2011 | Tsubusaki ................. 348/333.12 |

FOREIGN PATENT DOCUMENTS

| JP | 2009-033651 A | 2/2009 |
| JP | 2009-089048 A | 4/2009 |

* cited by examiner

*Primary Examiner* — Bryan Bui
(74) *Attorney, Agent, or Firm* — Studebaker & Brackett PC

(57) ABSTRACT

A movement detection device that includes an acceleration detection unit, a splitting unit and a movement detection unit is provided. The acceleration detection unit detects each respective acceleration component of acting acceleration for each axis of a three-dimensional orthogonal coordinate system and outputs respective acceleration component data. The splitting unit splits the respective acceleration component data output from the acceleration detection unit into a stationary component obtained by low-pass filter processing and a movement component that is the respective acceleration component data from which the respective stationary component has been removed. The movement detection unit detects which axial direction the acceleration detection unit has moved in for each of the axes based on a movement component indicating the maximum value split by the splitting unit.

6 Claims, 13 Drawing Sheets

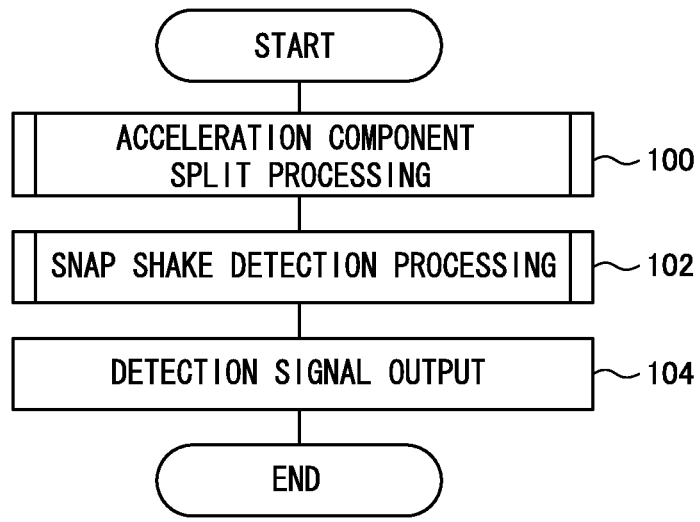
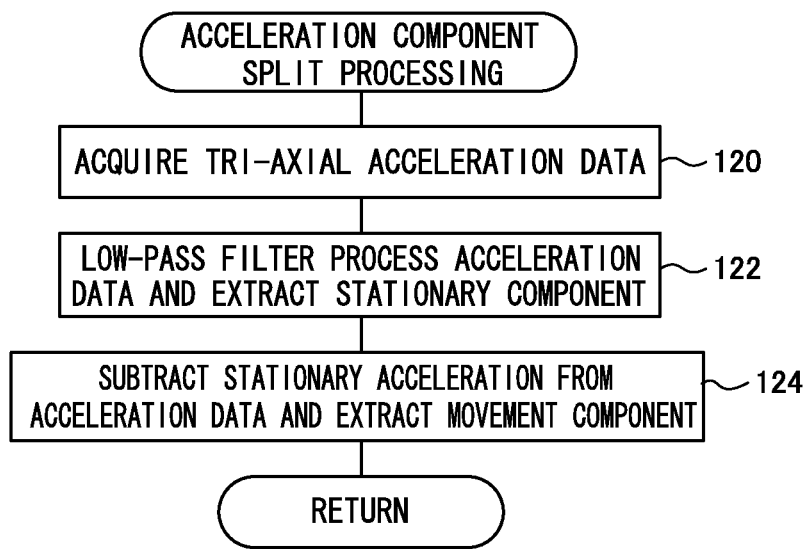

MOVEMENT DETECTION DEVICE, ELECTRONIC DEVICE, MOVEMENT DETECTION METHOD AND STORAGE MEDIUM STORED WITH A PROGRAM

CROSS-REFERENCE TO RELATED APPLICATION

This application is based on and claims priority under 35 USC 119 from Japanese Patent Application No. 2009-198296 filed Aug. 28, 2009.

BACKGROUND OF THE INVENTION

1. Field of the Invention

The present invention relates to a movement detection device, an electronic device, a movement detection method, and a storage medium stored with a program, and in particular to a movement detection device, an electronic device, a movement detection method, and a storage medium stored with a program that detect movement by employing a tri-axial acceleration sensor.

2. Description of the Related Art

Conventionally, in an electronic device, such as a mobile phone or the like, a tri-axial acceleration sensor is internally provided, acceleration component data is detected for each axial direction of the tri-axial acceleration sensor, and computation of the inclination angle of the electronic device is performed.

During computation of the inclination angle of the electronic device, sometimes the inclination angle cannot be accurately computed if an external disturbance occurs, such as from a vibration function or the like. Therefore, there is a proposal for a portable electronic device in which acceleration values, these being the magnitude of acceleration vectors, are computed from tri-axial acceleration data detected by the tri-axial acceleration sensor, and when the difference between the acceleration value and the acceleration value in a stationary state is a specific value or greater, determination is made that external disturbance has occurred, and the inclination angle is computed without using the acceleration data during occurrence of the external disturbance (see, for example, Japanese Patent Application Laid-Open (JP-A) No. 2009-89048).

There is also a proposal for a mobile electronic device in which acceleration data is detected by an acceleration sensor provide internally to a mobile phone, the amount of inclination for each of three axes is computed and which of the faces of the mobile phone faces in which direction is ascertained with the ground as a reference, the acceleration occurring when a particular face of the mobile phone is tapped is detected, determination is made as to whether or not the applied acceleration is a threshold value or greater, and the face to which force has been applied is computed (see, for example, JP-A No. 2009-33651).

However, in the technology of above JP-A No. 2009-89048, while the presence or not of external disturbance can be determined, since the direction movement occurring due to the external disturbance cannot be determined, when performing a specific input operation, as with motion input by making the electronic device move in a specific direction, it is only suitable for one type of input, and plural operations cannot be accommodated.

In the technology of JP-A No. 2009-33651, the direction and magnitude of the acceleration applied is computed by using vector summation, however there is no specific reference therein as to whether there is correspondence assigned in any manner between the direction of the vector sum and each axial direction, and sometimes the axial direction cannot be accurately determined.

SUMMARY OF THE INVENTION

The present invention addresses the above issues, and an object thereof is to provide a movement detection device, an electronic device, a movement detection method, and a storage medium stored with a program that can accurately detect which axial direction has been moved in using simple processing.

In order to achieve the above object, a movement detection device of a first aspect is configured including: an acceleration detection unit that detects each respective acceleration component of acting acceleration for each axis of a three-dimensional orthogonal coordinate system and outputs respective acceleration component data; a splitting unit that splits the respective acceleration component data output from the acceleration detection unit into a stationary component obtained by low-pass filter processing and a movement component that is the respective acceleration component data from which the respective stationary component has been removed; and a movement detection unit that detects which axial direction the acceleration detection unit has moved in for each of the axes based on a movement component indicating the maximum value split by the splitting unit.

According to the first aspect, the acceleration detection unit detects each respective acceleration component of acting acceleration for each axis of a three-dimensional orthogonal coordinate system and outputs respective acceleration component data, and the splitting unit splits the respective acceleration component data output from the acceleration detection unit into the stationary component obtained by low-pass filter processing and the movement component that is the respective acceleration component data from which the respective stationary component has been removed. The movement detection unit then detects which axial direction the acceleration detection unit has moved in for each of the axes based on a movement component indicating the maximum value split by the splitting unit.

Accordingly, since which axial direction the acceleration detection unit has moved in is detected based on the movement component indicating the maximum value out of the respective movement components, which are the acceleration component data from which the stationary components obtained by low-pass filter processing have been removed, which axial direction has been moved in can be accurately detected using simple processing.

In the first aspect, configuration can be made such that the movement detection unit detects the acceleration detection unit as having moved in the axial direction corresponding to the movement component indicating the maximum value when the movement detection unit is moved to-and-fro along one of the axial directions if, when the movement component indicating the maximum value first exceeded a predetermined first threshold value, a time period from when the movement component exceeds a predetermined second threshold value until it next exceeds the second threshold value is within a range of a predetermined specific time period, or if, when the movement component indicating the maximum value first exceeded the predetermined second threshold value, a time period from when the movement component exceeds the first threshold value until it next exceeds the first threshold value is within the range of the predetermined specific time period. Accordingly, only specific movements that exceed threshold values within the range of the specific time period are detected, and misdetection can be prevented.

A movement detection device of a second aspect is configured including: an acceleration detection unit that detects each respective acceleration component of acting acceleration in each axis of a three-dimensional orthogonal coordinate system and outputs respective acceleration component data; a splitting unit that splits the respective acceleration component data output from the acceleration detection unit into a stationary component obtained by low-pass filter processing and a movement component that is the respective acceleration component data from which the respective stationary component has been removed; and a gravitational axis determination unit that determines which one of the axes is the gravitational axis corresponding to the direction of gravity, based on the stationary component when the acceleration detection unit has been moved in the direction of gravity with one of the axes facing the direction of gravity.

According to the movement detection device of the second aspect, the acceleration detection unit detects each respective acceleration component of acting acceleration in each axis of a three-dimensional orthogonal coordinate system and outputs the respective acceleration component data; the splitting unit splits the respective acceleration component data output from the acceleration detection unit into the stationary component obtained by low-pass filter processing and the movement component that is the respective acceleration component data from which the respective stationary component has been removed. Since the values are different for the stationary component of the gravitational axis and the stationary component for other axes than the gravitational axis, the gravitational axis determination unit determines which one of the axes is the gravitational axis corresponding to the direction of gravity, based on the stationary component when the acceleration detection unit has been moved in the direction of gravity with one of the axes facing the direction of gravity.

Accordingly, since the gravitational axis is detected based on the stationary component obtained by low-pass filter processing the acceleration component data when the acceleration detection unit has been moved in the direction of gravity with one of the axes facing the direction of gravity, the direction of gravity, namely the axial direction moved in, can be accurately detected by simple processing.

In the second aspect, configuration can be made such that the gravitational axis determination unit detects that the acceleration detection unit has moved in the direction of gravity and the opposite direction to the direction of gravity when the movement component in the gravitational axis has exceeded a predetermined positive direction first threshold value and a predetermined negative direction second threshold value at least once each alternately within a specific time period. Accordingly, only specific movement such that a threshold value is exceeded is detected, and misdetection can be prevented.

An electronic device of a third aspect is an electronic device equipped with the movement detection device of the first or the second aspect. Application can be made, for example, to a mobile phone, a game consul controller, or the like, as the electronic device.

A movement detection method of a fourth aspect is method including: detecting with an acceleration detection unit each respective acceleration component of acceleration acting on the acceleration detection unit for each axis of a three-dimensional orthogonal coordinate system and outputting respective acceleration component data; splitting the respective acceleration component data output from the acceleration detection unit into a stationary component obtained by low-pass filter processing and a movement component that is the respective acceleration component data from which the respective stationary component has been removed; and detecting which axial direction the acceleration detection unit has moved in for each of the axes based on a movement component indicating the maximum split value, or determining which one of the axes is the gravitational axis corresponding to the direction of gravity, based on the stationary component when the acceleration detection unit has been moved in the direction of gravity with one of the axes facing the direction of gravity.

A movement detection program of a fifth aspect is a storage medium storing a program that causes a computer to function as: a splitting unit that splits respective acceleration component data output from an acceleration detection unit, which detects each respective acceleration component of acceleration acting on the acceleration detection unit for each axis of a three-dimensional orthogonal coordinate system and outputs the respective acceleration component data, into a stationary component obtained by low-pass filter processing and a movement component that is the respective acceleration component data from which the respective stationary component has been removed; and a movement detection unit that detects which axial direction the acceleration detection unit has moved in for each of the axes based on a movement component indicating the maximum split value, or a gravitational axis determination unit that determines which one of the axes is the gravitational axis corresponding to the direction of gravity, based on the stationary component when the acceleration detection unit has been moved in the direction of gravity with one of the axes facing the direction of gravity.

As explained above, according to the movement detection device, the electronic device, the movement detection method, and the program of the present invention, an effect is obtained by which accurate detection can be made of which axial direction has been moved in with simple processing, since the axial direction moved in is detected by employing the stationary component obtained by low-pass filter processing the acceleration component data, or by employing the movement component that is the acceleration component data from which the stationary component has been removed.

BRIEF DESCRIPTION OF THE DRAWINGS

Exemplary embodiments of the present invention will be described in detail based on the following figures, wherein:

FIG. 5 is a flow chart showing the contents of a movement detection processing routine in a movement detection device of a first exemplary embodiment;

FIG. 6 is a flow chart showing the contents of an acceleration component split processing routine in the movement detection device of the first exemplary embodiment;

DETAILED DESCRIPTION OF THE INVENTION

Detailed explanation follows regarding exemplary embodiments of the present invention, with reference to the drawings.

Figure 1:
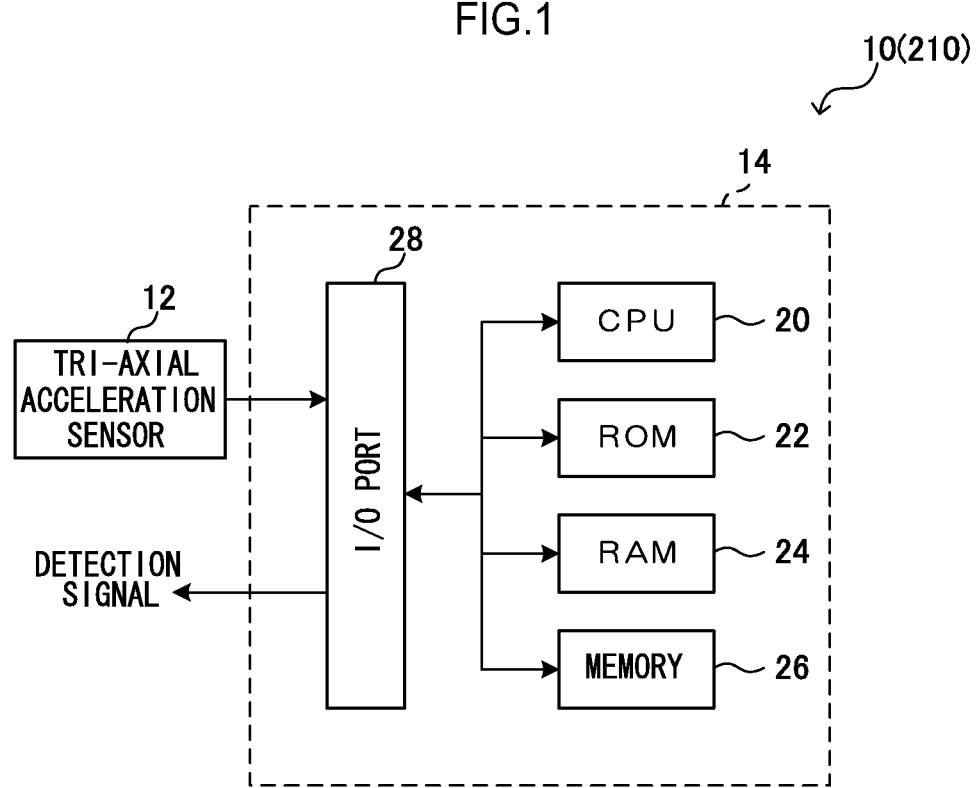
FIG. 1 is a block diagram showing a configuration of a movement detection device of an exemplary embodiment of the present invention.

As shown in FIG. 1, a movement detection device 10 of a first exemplary embodiment is equipped with a tri-axial acceleration sensor 12 that detects acceleration components in each axial direction of an X axis, a Y axis, and a Z axis in an orthogonal coordinate system, and outputs acceleration component data, and with a microcomputer 14 that detects in which axial direction the movement detection device 10 has moved and outputs a detection signal according to the detected axial direction.

Figure 2:
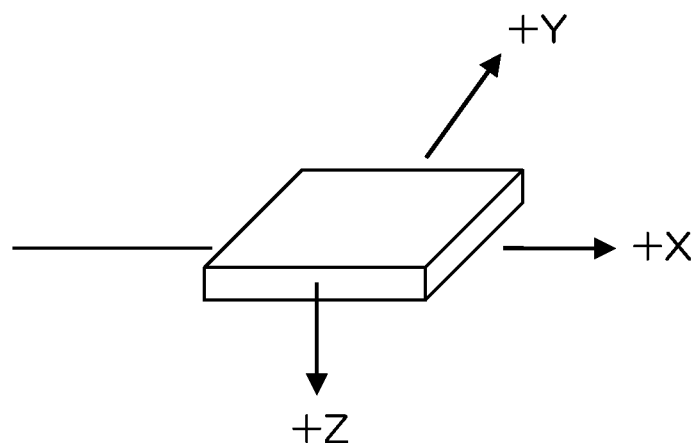
FIG. 2 is an external perspective view showing a tri-axial acceleration sensor employed in a movement detection device of an exemplary embodiment of the present invention.

The tri-axial acceleration sensor 12 detects acceleration components in each axial direction of the X axis, the Y axis, and the Z axis in an orthogonal coordinate system, as shown in FIG. 2, and outputs acceleration component data. In the acceleration component data the direction of the acceleration component is expressed by the sign ("+" or "−") of the acceleration component data value, and the magnitude of the acceleration component is expressed by the absolute value of the acceleration component data value. The direction of the acceleration components is defined such that towards the right is "+" for the X axis in FIG. 2, and towards the left therefor is "−". The direction into the page is "+" for the Y axis in FIG. 2, and the direction out of the page therefor is "−". Downwards is "+" for the Z axis in FIG. 2, and upwards therefor is "−". Accordingly, acceleration components can be detected in six directions, the X axis + direction, the X axis − direction, the Y axis + direction, the Y axis − direction, the Z axis + direction, and the Z axis − direction.

The tri-axial acceleration sensor 12, outputs acceleration component data of "0g" for the X axis and the Y axis and outputs acceleration component data "+1g" for the Z axis when in a stationary state with the orientation shown in FIG. 2. Note that "g" is gravitational acceleration, expressing the units of the acceleration component data.

The microcomputer 14 is configured including: a CPU 20 that controls the movement detection device 10 overall; ROM 22, serving as a storage medium on which various programs, such as, for example, a movement detection program, described below, are stored; RAM 24 serving as a work area for temporarily storing data; a memory 26 serving as a storage unit stored with various data; an input-output (I/O) port 28; and a bus connecting these all together. The I/O port 28 is connected to the tri-axial acceleration sensor 12.

Next, explanation follows regarding the operation of the movement detection device 10 of the first exemplary embodiment. Explanation follows regarding a case of detecting which axial direction the movement detection device 10 has been shaken when the movement detection device 10 is shaken along one of the axial directions in the first exemplary embodiment. Note that in the first exemplary embodiment, shaking the movement detection device 10 in this manner along one of the axial directions of the tri-axial acceleration sensor 12 is referred to as a "snap shake".

Figure 3A:
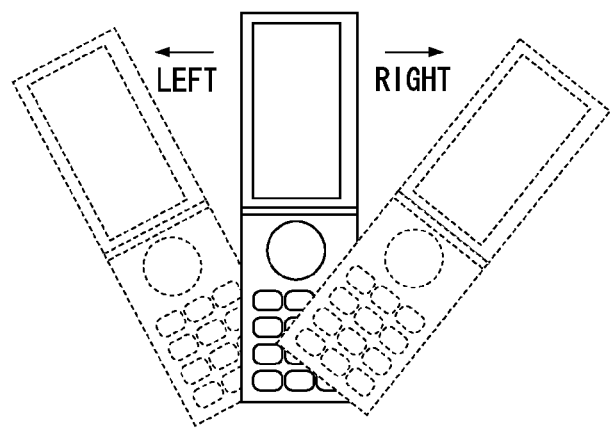
FIG. 3A is a diagram for explaining left-right shaking of a snap shake when vertically held.
Figure 3B:
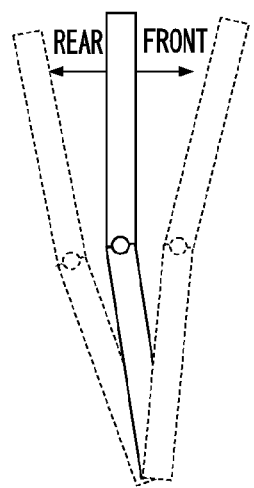
FIG. 3B is a diagram for explaining front-rear shaking of a snap shake when vertically held.
Figure 3C:
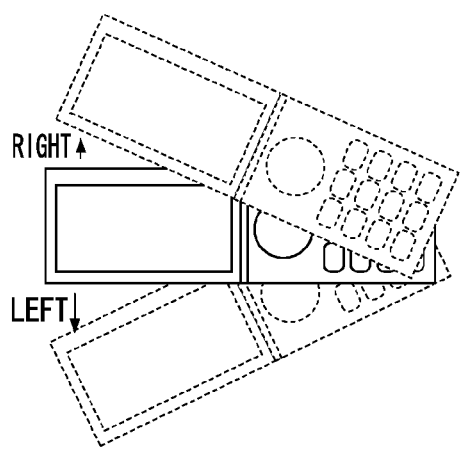
FIG. 3C is a diagram for explaining left-right shaking of a snap shake when horizontally held.
Figure 3D:
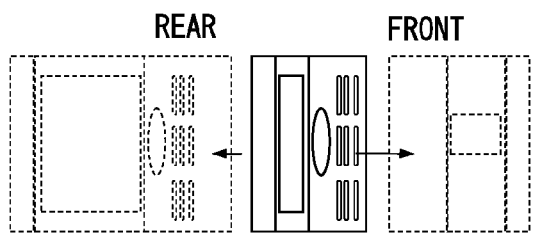
FIG. 3D is a diagram for explaining front-rear shaking of a snap shake when horizontally held.
Figure 4A:
FIG. 4A is a diagram for explaining shaking in the length direction of a snap shake when vertically held.
Figure 4B:
FIG. 4B is a diagram for explaining shaking in the length direction of a snap shake when horizontally held.

Explanation follows regarding snap shake of a mobile phone in which the movement detection device 10 of the first exemplary embodiment is employed, with reference to FIG. 3A to FIG. 3D and FIG. 4A. FIG. 3A illustrates a snap shake in the left-right direction when the mobile phone is held in the vertical direction (vertically held). FIG. 3B illustrates a snap shake in the front-rear direction when vertically held. FIG. 3C illustrates a snap shake in the left-right direction when the mobile phone is held in a horizontal direction (horizontally held). FIG. 3D illustrates a snap shake in the front-rear direction when horizontally held. FIG. 4A illustrates a snap shake in the length direction when vertically held. FIG. 4B illustrates a snap shake in the length direction when horizontally held.

Next, explanation follows regarding a movement detection processing routine in the movement detection device 10 of the first exemplary embodiment, with reference to FIG. 5. The current routine is performed by the CPU 20 executing the movement detection program stored on the ROM 22.

At step 100, acceleration component split processing is executed to split acceleration component data into a stationary component and a movement component. Explanation follows here regarding an acceleration component split processing routine, with reference to FIG. 6.

Figure 7:
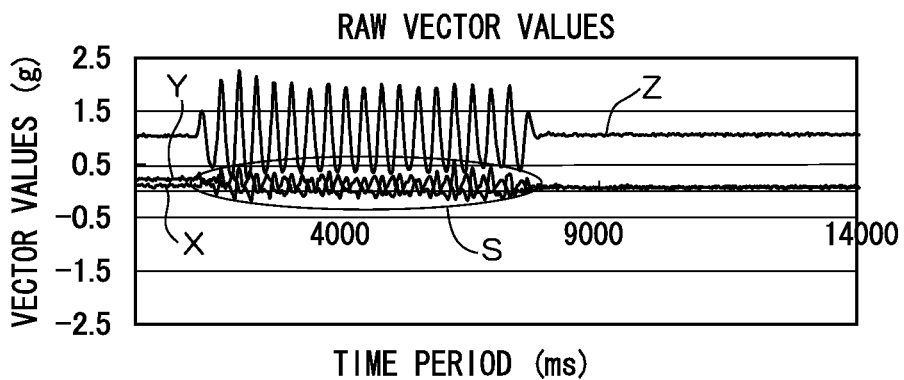
FIG. 7 is a graph showing acceleration component data when a tri-axial acceleration sensor has been shaken plural times in the direction of gravity from a horizontally placed state.

At step 120, acceleration component data is acquired from the tri-axial acceleration sensor 12 for each of the axes. An example of acquired acceleration component data is shown in FIG. 7. It is necessary to detect in which of the axial directions the movement detection device 10 has been shaken from this state, however, at the locations in the graph indicated by S (the outlined locations), there are plural points where the each of the acceleration component data for the three axes indicates values of about the same level, and at these points it is sometimes difficult to detect in which axial direction the movement detection device 10 was shaken.

Figure 8:
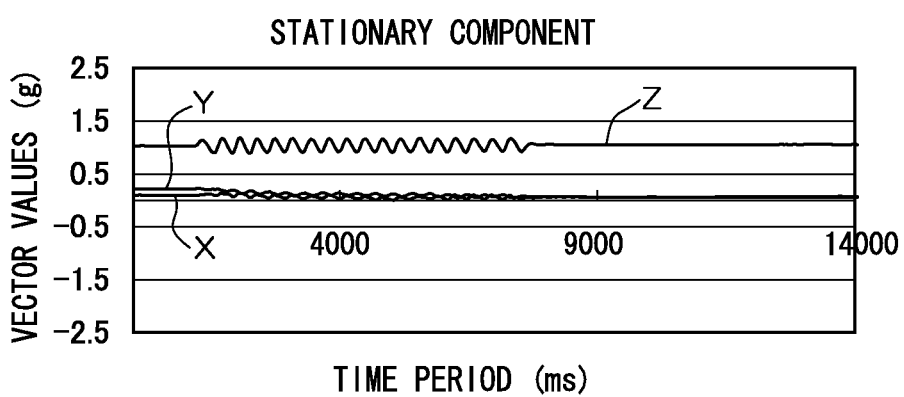
FIG. 8 is a graph showing stationary components obtained by low-pass filter processing the acceleration component data of FIG. 7.

Therefore, the routine next proceeds to step 122, and low-pass filter processing is performed on each of the acquired acceleration component data. Data that has been subjected to low-pass filter processing is shown in FIG. 8. As shown in FIG. 8, the acceleration component data after low-pass filter processing can be completely separated into the X axis and the Y axis showing substantially "0g", and the Z axis showing substantially "+1g". In this manner, data extracted by subjecting the acquired acceleration component data to low-pass filter processing is referred to as the "stationary component" of the acceleration component data.

Figure 9:
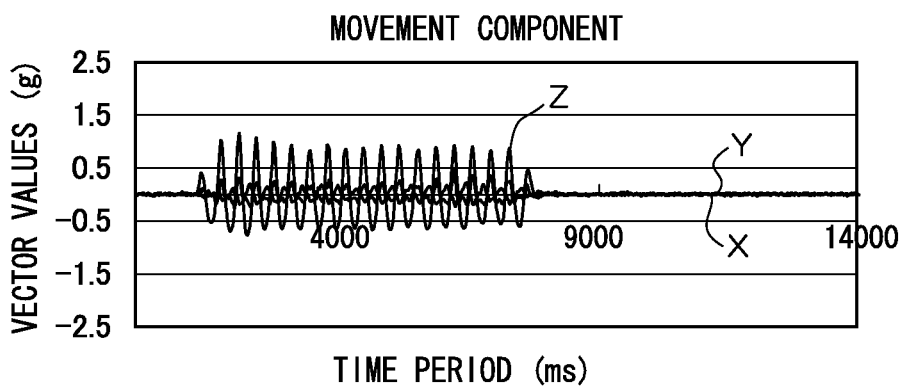
FIG. 9 is a graph showing a movement component obtained by subtracting the stationary component of FIG. 8 from the acceleration component data of FIG. 7.

Next, at step 124, data of the stationary component extracted in above step 122 is subtracted from the acceleration component data acquired at above step 120 for each of the X axis, Y axis, and Z axis, respectively. The data after subtraction is shown in FIG. 9. Data extracted in this manner by subtracting data after low-pass filter processing from the acquired acceleration component data is referred to as the "movement component" of the acceleration component data. The acceleration component data can be split with simple processing into stationary components and movement components by this method, without performing high precision high-pass filter processing.

Figure 10:
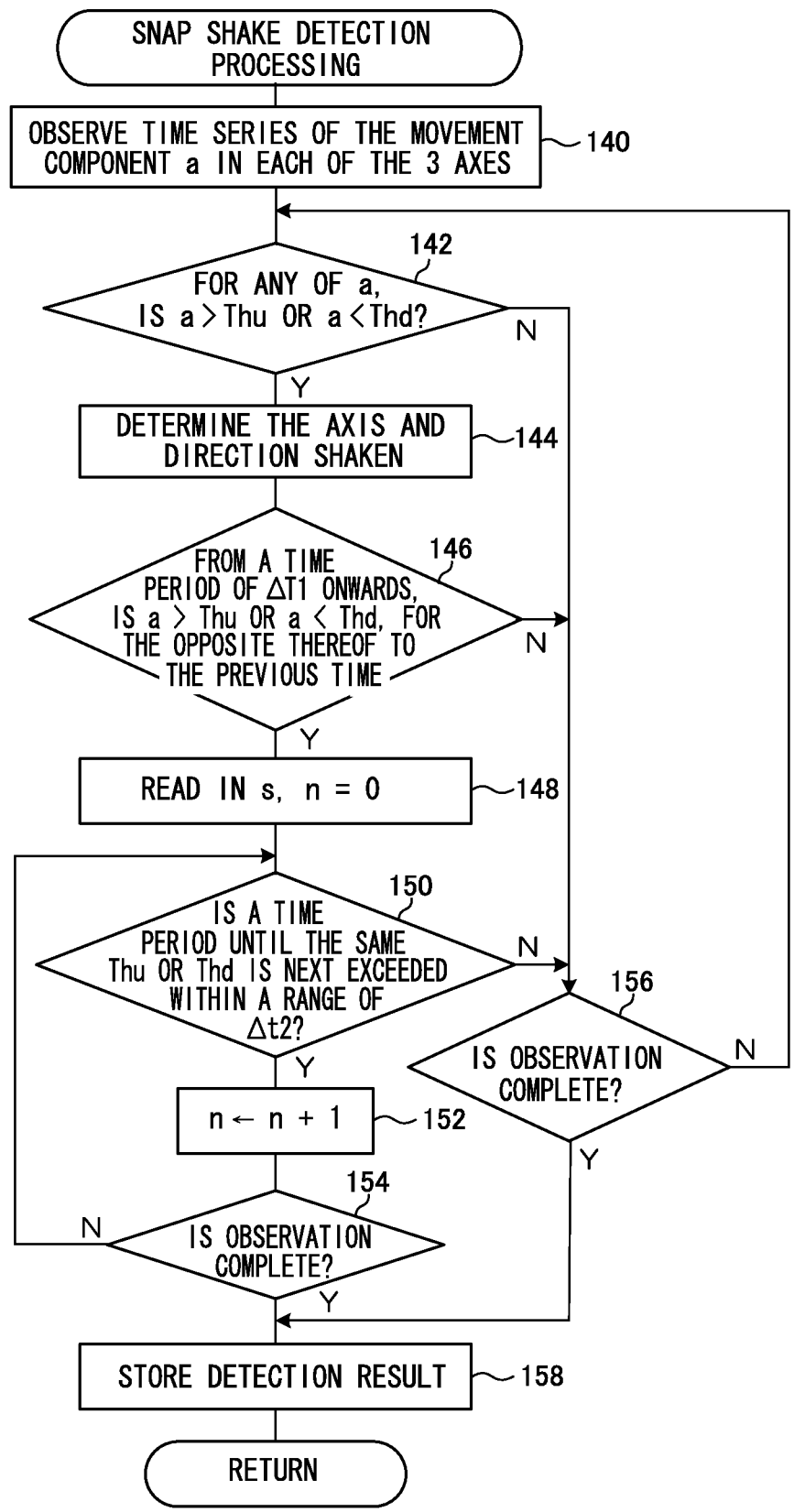
FIG. 10 is a flow chart showing the contents of a snap shake detection processing routine in the movement detection device of the first exemplary embodiment.

Next, the routine returns to step 102 of FIG. 5, and snap shake detection processing is executed to detect, as a snap shake, shaking of a predetermined magnitude or greater that was performed in a specific time period range. Explanation follows here regarding a snap shake detection processing routine, with reference to FIG. 10.

At step 140, observation is commenced of a time series of movement component a, extracted in the acceleration component split processing (FIG. 6) of step 124, for each of the 3 axes.

Next, at step 142, determination is made as to whether or not the movement component a of one of the axes has exceeded either a predetermined + direction threshold value Thu or a − direction threshold value Thd. Note that since the wave form of the movement component for a snap shake differs depending, for example, on the installation position of the movement detection device 10 in the electronic device it is installed in, or the like, the threshold value Thu and the threshold value Thd are each made so as to be respectively separately settable in consideration of the installation position or the like. When one of the movement components a exceeds one of the threshold values the routine proceeds to step 144, and when none of the movement components a exceeds the threshold values the routine proceeds to step 156.

Figure 11A:
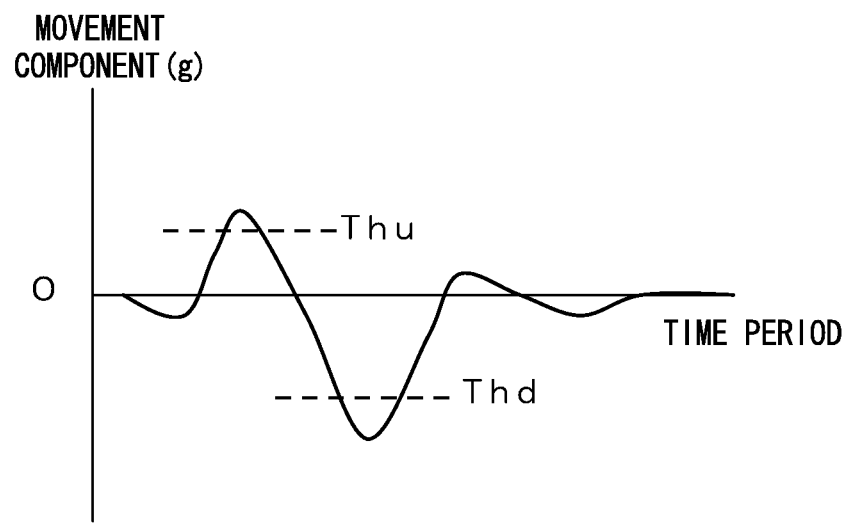
FIG. 11A and FIG. 11B are graphs for explaining a method of determining the direction of snap shake in the first exemplary embodiment.
Figure 11B:
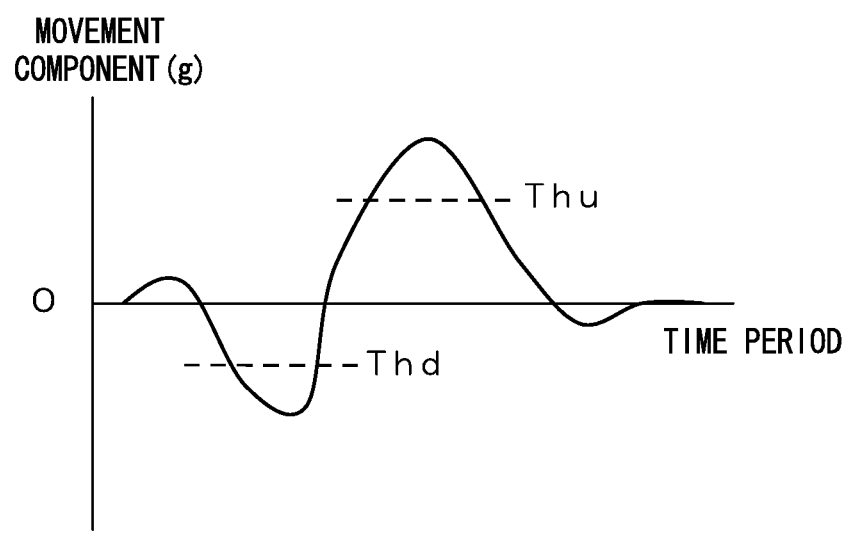

At step 144, determination is made that the movement detection device 10 was shaken in the axial direction corresponding to the movement component a determined to have exceeded the one of the threshold values at above step 142. Determination is also made as to whether it was shaken in the + direction or − direction of the axial direction, by which of the threshold values was first exceeded. As shown in FIG. 11A, when the movement component a first exceeded the threshold value Thu the shaking is determined to have been in the + direction, and, as shown in FIG. 11B, when the threshold value Thd was first exceeded the shaking is determined to have been in the − direction. More specifically, if the movement component $a_z$ in the Z axis exceeded the threshold value before the movement component $a_x$ in the X axis and the movement component $a_y$ in the Y axis, and the threshold value that was exceeded is the threshold value Thu, then the direction of shaking is determined to have been in the Z axis + direction.

Next, at step 146, determination is made as to whether or not, from a specific time period $\Delta t1$ onwards from when the movement component a exceeded either the threshold value Thu or the threshold value Thd at above step 142, the opposite one was exceeded of the threshold value Thu or the threshold value Thd to that exceeded the previous time. Namely, when the movement component a exceeded the threshold value Thu at the above step 142, determination is made as to whether or not the threshold value Thd was exceeded from the $\Delta t1$ onwards. When the movement component a exceeded the threshold value Thd in above step 142, determination is made as to whether or not the threshold value Thu was exceeded from the $\Delta t1$ onwards. Note that $\Delta t1$ is a snap shake ineffective time period for preventing incorrect determination, and is a specific time period such that a snap shake is not detected when the time period from exceeding one of the threshold values to exceeding the other of the threshold values is less than $\Delta t1$. From $\Delta t1$ onwards, when the movement component a has exceeded the opposite one of the threshold value Thu or the threshold value Thd, the routine proceeds to step 148, and when the movement component a has exceeded the opposite one of the threshold value Thu or the threshold value Thd prior to $\Delta t1$ elapsing, the routine proceeds to step 156. Note that after the $\Delta t1$ has elapsed, if the movement component a has not exceeded the opposite one of the threshold value Thu or the threshold value Thd even though a specific time period has elapsed, the routine proceeds to step 156.

At step 148, a variable n is set to 0, and the snap shake setting number s is read in. The variable n is a variable for counting the number of times of snap shake detection, and is incremented by 1 each time a snap shake is detected. The snap shake setting number s is a set value such that a single detection signal is output when successive snap shakes have been detected s times, and is settable as desired. Explanation here is of a case where s=2.

Next, at step 150, determination is made as to whether or not the time period from when determination was made at above step 146 that the movement component a exceeded the opposite one of the threshold value Thu or the threshold value Thd to the previous time, up to the time of next exceeding the same threshold value Thu or threshold value Thd, is within the range of a specific time period $\Delta t2$. Namely, when the threshold value Thu was exceeded at above step 146, determination is made as to whether or not the time period until the movement component a next exceeds the threshold value Thu is within the range of $\Delta t2$. When the threshold value Thd was exceeded at above step 146, determination is made as to whether or not the time period until the movement component a next exceeds the threshold value Thd is within the range of $\Delta t2$. Note that $\Delta t2$ is a snap shake determination cycle, and is a specific time period in order to prevent incorrect determination, such that shaking exceeding a specific frequency range is not detected as a snap shake. When determination is affirmative the routine proceeds to step 152, and when determination is negative proceeds to step 156.

Figure 12:
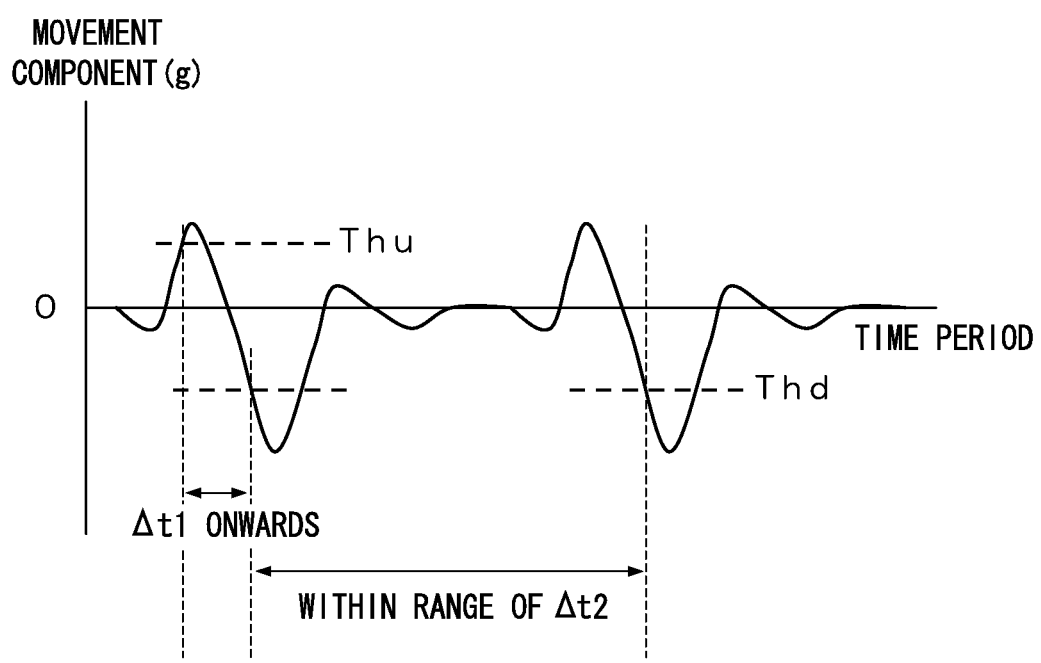
FIG. 12 is a graph for explaining the detection of snap shake in the first exemplary embodiment.

Note that $\Delta t1$ and $\Delta t2$ are for preventing unintentional actuation such as, for example, when walking, when running, or when riding in a vehicle, and are set as appropriate time periods such that snap shake determination is not made when the waveform cycle of the acceleration component data is slow (when walking or when running: about 4 Hz or less), or is fast (limit of snap shake: about 6 Hz or greater). FIG. 12 shows the snap shake ineffective time period $\Delta t1$ and the snap shake determination cycle $\Delta t2$ for a case when one of the movement components first exceeded the threshold value Thu.

At step 152, in order that detection of one time of snap shake is counted, the variable n is incremented by 1, the routine proceeds to step 154, and determination is made as to whether or not observation is completed. This determination, for example, can be made that observation is complete when the movement component a is substantially 0 for a specific time period or greater. When observation is complete, the routine proceeds to step 158, and when observation is not complete the routine returns to step 150.

However, when negative determination is made at above step 142, step 146, or step 150 and the routine has proceeded to step 156, determination is made as to whether or not observation is complete, and when observation is complete the routine proceeds to step 158, and when not complete the routine returns to step 142.

At step 158, a detection result is derived based on the number of times n of the detected snap shakes and the snap shake setting number s, and the detection result is temporarily stored in a specific storage region. Since s=2 here, if the detection result is that the number of times n of the detected snap shakes is 2 times, then one output worth of a detection signal is output, and if n is 4 times, then two outputs worth of a detection signal is output. For cases where n is 3 times, 5 times, or the like, the detection result derived by performing rounding up or rounding down. In cases where n is 1 time, since the condition s=2 is not satisfied, the detection result is "nil".

Note that while explanation has been given above of a case where plural outputs worth of a detection signal are obtained by a single occasion of detection processing, configuration may be so as to detect only one output worth of a detection signal at a single detection occasion. In such cases, observation may also be completed at above step 154 when n=s.

Next, returning to step 104 of FIG. 5, a detection signal is generated and output based on the detection result of the snap shake detection processing (FIG. 10) stored at step 158.

For example, explanation follows regarding a case where the movement detection device 10 of the first exemplary embodiment is provided to a mobile phone, such that length direction upward facing is the X axis + direction, downward facing is the X axis − direction, the width direction left facing is the Y axis + direction, right facing is the Y axis − direction, the thickness direction facing away is the Z axis + direction, and facing towards is the Z axis − direction.

Correspondence can be assigned of the contents of various operational inputs against snap shake directions, such as, for example, a snap shake towards the left with an increase in volume, towards the right direction with a decrease in volume, forwards with a 1seg channel change (back), rearward with a 1seg channel change (forward), downward with progression to the next page in an address book, upward with return to the previous page in an address book, or the like. Consequently, in the current step, a detection signal according to such correspondence is output. Note that in the first exemplary embodiment, since shaking is detected based on the movement components, snap shakes along the axial direction can be detected irrespective of whether the mobile phone is vertically held or horizontally held. For example, when the detection result is the Y axis + direction, a detection signal is made so as to increase the volume. When a detection result for plural outputs worth is obtained, the detection signal is made so as to operate the degree of up-down according to these outputs worth. For example, in the above example of s=2, when a snap shake of n=4 is detected a detection result of two outputs worth is stored, and so the detection signal is made so as to increase the volume by two steps.

As explained above, according to the movement detection device of the first exemplary embodiment, data after low-pass filter processing of acceleration component data acquired from the tri-axial acceleration sensor is split into a stationary component, and a movement component of data in which the stationary component has been subtracted from the acquired acceleration component data, and snap shake in the direction corresponding to the axis where the respective movement component of the 3 axes first exceeded the threshold value. Therefore, which of the axial directions moved in can be accurately detected with simple processing.

Next, explanation follows regarding a movement detection device 210 (FIG. 1) of a second exemplary embodiment. In the first exemplary embodiment, explanation has been given of a case of detection of whether there had been shaking in one of the axial directions, however, in the second exemplary embodiment, explanation follows of a case where detection is of shaking in the direction of gravity, and which one of the axes is the gravitational axis is determined. Note that since the configuration of the movement detection device 210 of the second exemplary embodiment is similar to that of the movement detection device 10 of the first exemplary embodiment, further explanation thereof is omitted.

Next, explanation follows regarding the operation of the movement detection device 210 of the second exemplary embodiment. In the second exemplary embodiment, the movement detection device 210 is shaken in the direction of gravity with one of the faces of the tri-axial acceleration sensor 12 facing down, which face is facing down is detected by determining the direction of gravity, and different detection signals are output according to this determination. Note that in the second exemplary embodiment, shaking the movement detection device 210 in the direction of gravity in this manner, with one of the tri-axial acceleration sensor 12 faces facing down, is referred to as "shaking".

Explanation follows regarding the reason here the direction of shaking is made the direction of gravity in the second exemplary embodiment.

Figure 13A:
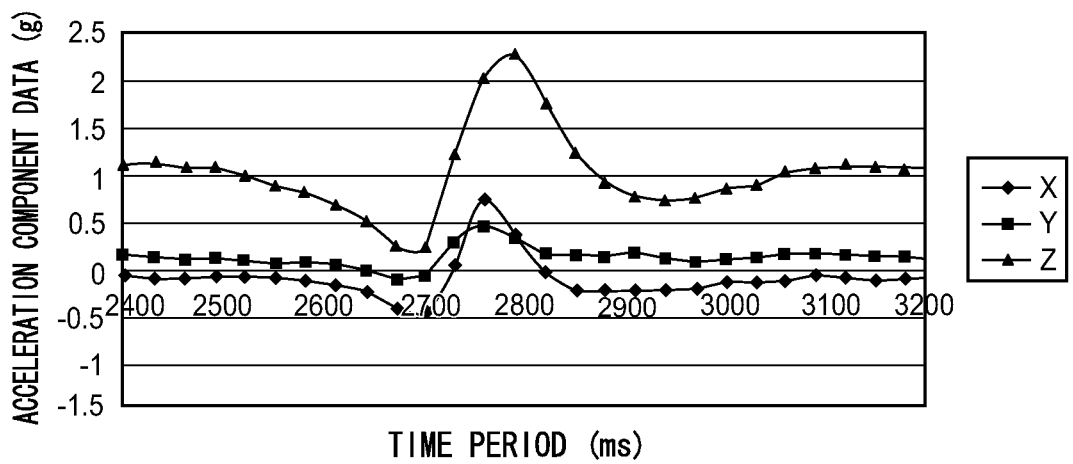
FIG. 13A is a graph showing acceleration component data when a tri-axial acceleration sensor is shaken once in the direction of gravity from a horizontally placed state.
Figure 13B:
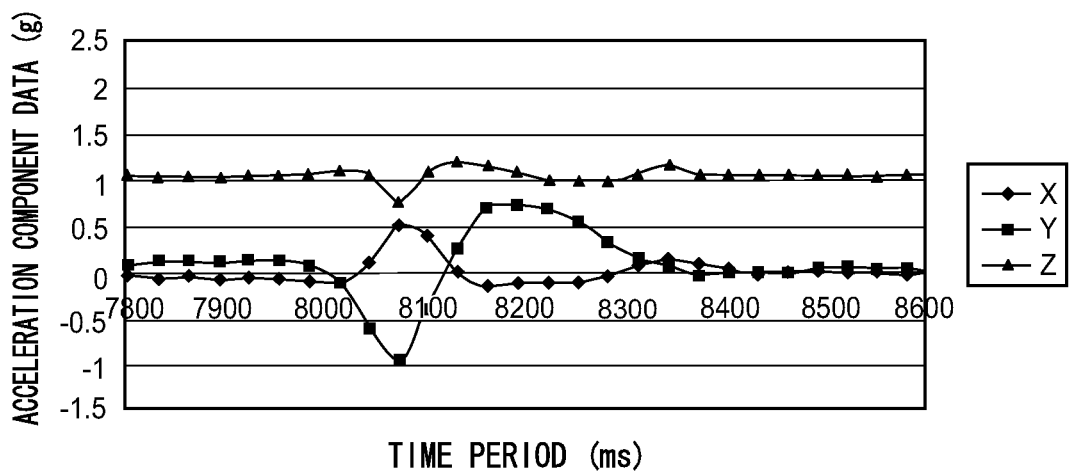
FIG. 13B is a graph showing acceleration component data when a tri-axial acceleration sensor is shaken once in a horizontal direction from a horizontally placed state.

For example, as shown in FIG. 2, in a state in which the tri-axial acceleration sensor 12 is placed horizontally such that the Z axis + direction is in the direction of gravity, namely, in a state in which the acceleration component data for the X axis and the Y axis is "0g", and the acceleration component data for the Z axis is "+1g", the acceleration component data for each of the axes when the movement detection device 210 is shaken once in the direction of gravity is shown in FIG. 13A, and the acceleration component data for each of the axes when shaken once sideways along the Y axis is shown in FIG. 13B. As shown in FIG. 13A, when shaken in the direction of gravity, the amplitude of the acceleration component data for the Z axis is greater in comparison to the acceleration component data for the X axis and the Y axis. The value of the acceleration component data also changes more in the + direction. Consequently, it can be determined that the movement detection device 210 was shaken in the Z axis + direction.

However, as shown in FIG. 13B, when shaken in the Y axis direction, not only the acceleration component data for the Y axis but also a similar level of amplitude is detected for the acceleration component data of the X axis, although the direction of the amplitude thereof is the opposite direction thereto. Therefore, there is a chance of incorrect determination that the movement detection device 210 was shaken in the X axis direction, even though it was actually shaken in the Y axis direction.

Therefore, in the second exemplary embodiment it is assumed that the shaking is in the direction of gravity, this having a high accuracy for the shaking direction.

Figure 14:
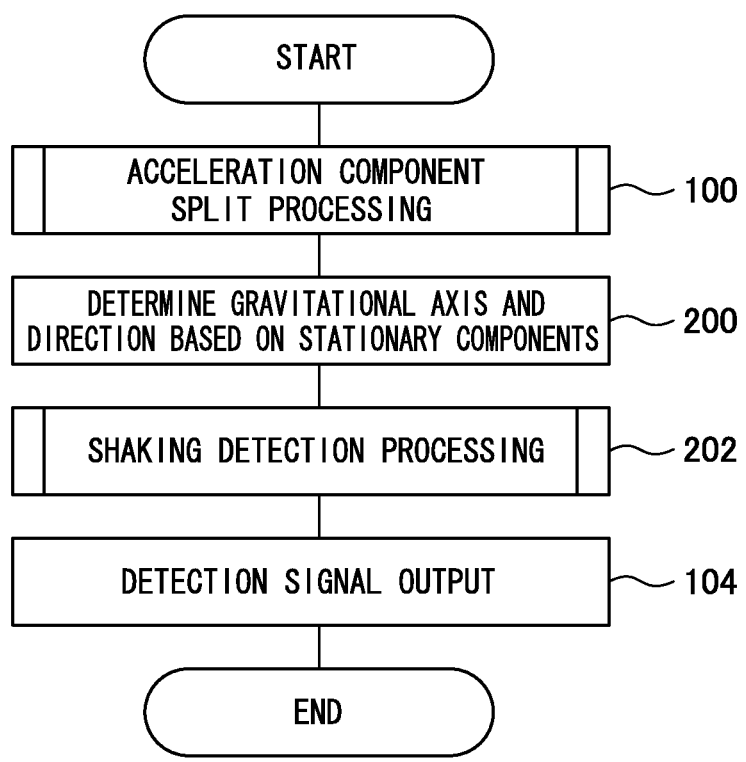
FIG. 14 is a flow chart showing the contents of a movement detection processing routine in the movement detection device of the second exemplary embodiment.

Explanation follows regarding a movement detection processing routine in the second exemplary embodiment, with reference to FIG. 14. The current routine is performed by the CPU 20 executing a movement detection program stored in the ROM 22. Note that similar processing to the processing of the movement detection device 10 in the first exemplary embodiment is allocated the same reference numeral and further explanation thereof is omitted.

At step 100, acceleration component split processing is executed. When the movement detection device 210 is in a stationary state with the Z axis + direction in the direction of gravity, the acceleration component data for the X axis and the Y axis is "0g", and the acceleration component data for Z axis is "+1g", and it can be determined that the Z axis + direction is in the direction of gravity. However, as shown in FIG. 7, at the locations indicated by S (the outlined locations) in the graph of the shaken movement detection device 210, there are plural points where the respective acceleration component data for the three axes indicates values of about the same level, and at these points, sometimes it cannot be determined which of the axes corresponds to the direction of gravity. Therefore, in a similar manner to the acceleration component split processing in the first exemplary embodiment (FIG. 6), the acceleration component data is split into stationary components and movement components.

Next, at step 200, determination is made of the axis and direction corresponding to the direction of gravity (referred to below as the "gravitational axis") based on the stationary component extracted at step 122 of acceleration component split processing (FIG. 6). For example, when a stationary component as shown in FIG. 8 is extracted, due to the stationary component for the Z axis indicating "+1g", the Z axis + direction is determined to be in the direction of gravity.

Next, at step 202, shaking detection processing is executed to detect, as shaking, shaking of a predetermined magnitude or greater. Explanation follows here regarding a shaking detection processing routine, with reference to FIG. 15.

At step 220, observation is commenced of a time series of the movement component a extracted at step 124 in the acceleration component split processing (FIG. 6) for the axis determined to be the gravitational axis at step 200 of FIG. 14.

Next, at step 222, the variable n is set at 0, and the shaking setting number s is read in. The variable n is a variable for counting the number of detection times of shaking, and is incremented by 1 each time shaking is detected. The shaking setting number s is a setting value such that a single detection signal is output when successive shaking has been detected s times, and is settable as desired. Explanation here is regarding a case where s=2.

Figure 16:
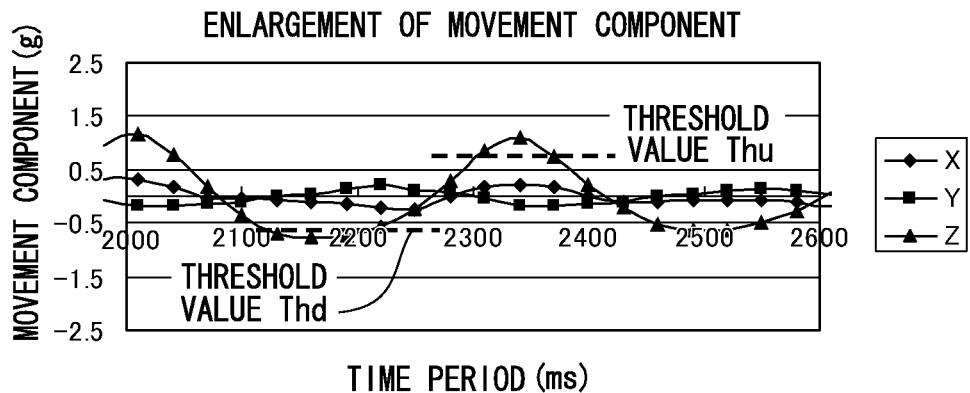
FIG. 16 is a graph showing movement components, a positive direction threshold value Thu and a negative direction threshold value Thd.

Next, at step 224, determination is made as to whether or not the movement component a has exceeded either a predetermined + direction threshold value Thu or a − direction threshold value Thd. FIG. 16 is an enlarged graph of a portion of the variation with time of the movement component a. Values are set for the threshold value Thu and the threshold value Thd so as to detect, as shaking, shaking of a predetermined magnitude or greater. The routine proceeds to step 226 when one or other is exceeded, and the routine proceeds to step 232 when neither is exceeded.

Figure 17:
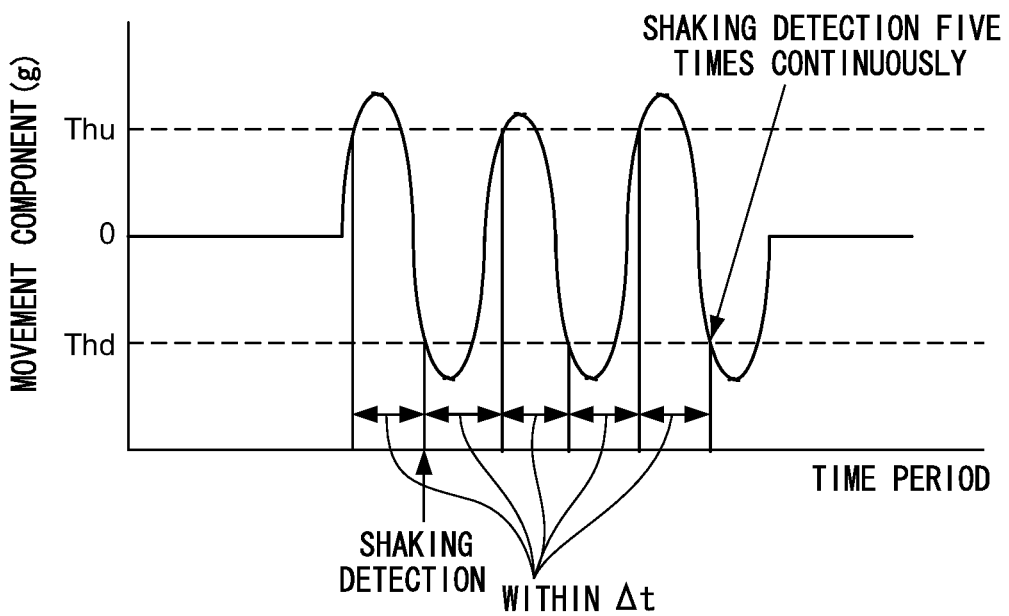
FIG. 17 is a graph for explaining detection of shaking in the second exemplary embodiment.

At step 226, determination is made as to whether or not, within a specific time period Δt from when determination at above step 224 was made that the movement component a exceeded the threshold value Thu or the threshold value Thd, the opposite one of threshold value Thu or the threshold value Thd, to that exceeded the previous time, was exceeded. Namely, as shown in FIG. 17, when the movement component a exceeded the threshold value Thu at above step 224, determination is made as to whether or not the threshold value Thd was exceeded within Δt. Or when the movement component a exceeded the threshold value Thd at above step 224, determination is made as to whether or not the threshold value Thu was exceeded within Δt. Note that Δt is a shaking determination time period for preventing incorrect determination, and is a specific time period such that detection as shaking is not made when the time period from exceeding one of the threshold values to exceeding the other threshold value exceeds Δt. When the movement component a exceeds the opposite one of the threshold value Thu or the threshold value Thd within Δt, the routine proceeds to step 228, and when Δt has elapsed without the movement component a exceeding the opposite one of the threshold value Thu or the threshold value Thd then the routine proceeds to step 232.

At step 228, the variable n is incremented by 1 in order to count the detection of one time of shaking, the routine proceeds to step 230, and determination is made as to whether or not observation is completed. This determination, for example, can be made that observation is complete when the movement component a has indicated substantially 0 for a specific time period or greater. When observation is complete, the routine proceeds to step 234, and when observation is not complete the routine returns to step 226.

However, when negative determination is made at above step 224 or step 226, and the routine has proceeded to step 232, determination is made as to whether or not observation is complete, and when observation is complete the routine proceeds to step 234, and when not complete the routine returns to step 222.

At step 234, a detection result is derived based on the number of times n of the detected shaking and the shaking setting number s, and the detection result is temporarily stored in a specific storage region. Since s=2 here, if the detection result is that the number of times n of shaking detected is 2 times, then one output worth of a detection signal is output, and if n is 4 times, then two outputs worth of a detection signal is output. For cases where n is 3 times, 5 times, or the like, the detection result derived by rounding up or rounding down. In cases where n is 1 time, since the condition s=2 is not satisfied, the detection result is "nil".

Note that while explanation has been given above of a case where plural outputs worth of a detection signal are obtained by a single time of detection processing, configuration may be so as to detect only one output worth of a detection signal for a single time of detection. In such a case, observation may also be completed at above step 230 when n=s. Furthermore, while explanation has been given here of a case where successive shaking is detected, configuration may be made to detect the number of times of intermittent shaking. In such cases, when negative determination is made at above step 232, the routine may return to step 224 such that the variable n is not reset.

Figure 15:
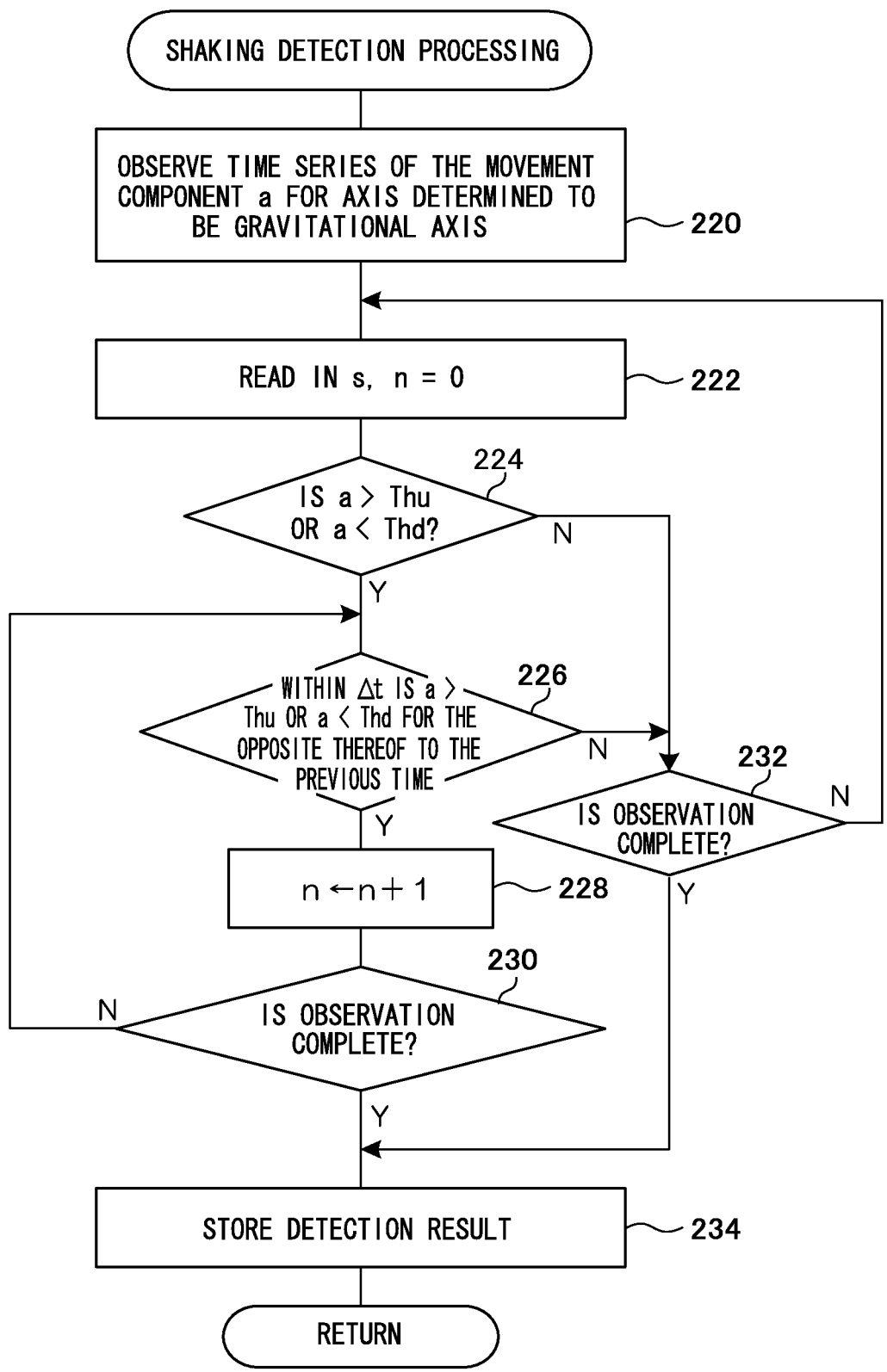
FIG. 15 is a flow chart showing the contents of a shaking detection processing routine in the movement detection device of the second exemplary embodiment.

Next, returning to step 104 of FIG. 14, a detection signal is generated and output based on the gravitational axis and direction determined at above step 200, and based on the detection result stored at step 234 of the shaking detection processing (FIG. 15).

For example, explanation follows of a case where the movement detection device 210 of the second exemplary embodiment is provided to a mobile phone, and correspondence can be assigned of the contents of various operational inputs against the axial direction facing down when shaking such that, for example, when the mobile phone is shaken orientated with the face corresponding to the Z axis + direction facing down the volume is increased, when shaken with the Z axis − direction the volume is decrease, when shaken with the X axis + direction a 1seg channel is changed (forward), when shaken with the X axis − direction a 1seg channel is changed (backward), shaking with the Y axis + direction is progression to the next page in an address book, shaking with the Y axis − direction is return to the previous page in an address book, or the like. Consequently, in the current step, the detection signal according to this correspondence is output. For example, when shaking with the Z axis + direction facing down is detected, the detection signal is made so as to increase the volume. When a detection result for plural outputs worth is obtained, the detection signal is made so as to operate the up-down degree according to these outputs worth. For example, in the above example of s=2, when shaking of n=4 is detected a detection result of two outputs worth is stored, and so the detection signal is made so as to increase the volume by two steps.

As explained above, according to the movement detection device of the second exemplary embodiment, when the movement detection device is shaken in the direction of gravity with one or other face thereof facing down, acceleration component data acquired from the tri-axial acceleration sensor is split into a stationary component obtained by low-pass filter processing and a movement component of in which the stationary component has been subtracted from the acquired acceleration component data, the gravitational axis and direction is determined based on the stationary component, and shaking is detected based on the movement component of the gravitational axis. Therefore, which axial direction is in the direction of gravity and what level of shaking has occurred in the direction of gravity can be accurately detected with simple processing.

Note that while explanation was given in the above exemplary embodiments of a case where the tri-axial acceleration sensor and the microcomputer are integrated together, configuration may be made such that only the tri-axial acceleration sensor is provided within the electronic device, and the microcomputer is provided externally to the electronic device.

What is claimed is:

1. A movement detection device comprising:
    an acceleration detection unit configured to detect each respective acceleration component of acting acceleration for each axis of a three-dimensional orthogonal coordinate system and outputs respective acceleration component data;
    a splitting unit configured to split the respective acceleration component data output from the acceleration detection unit into a stationary component obtained by low-pass filter processing and a movement component that is the respective acceleration component data from which the respective stationary component has been removed; and
    a movement detection unit configured to detect which axial direction the acceleration detection unit has moved in for each of the axes based on the movement component indicating a maximum value split by the splitting unit.

2. The movement detection device of claim 1, wherein the movement detection unit is further configured to detect the acceleration detection unit as having moved in the axial direction corresponding to the movement component indicating the maximum value when the movement detection unit is moved to-and-fro along one of the axial directions if, when the movement component indicating the maximum value first exceeded a predetermined first threshold value, a time period from when the movement component exceeds a predetermined second threshold value until it next exceeds the second threshold value is within a range of a predetermined specific time period, or if, when the movement component indicating the maximum value first exceeded the predetermined second threshold value, a time period from when the movement component exceeds the first threshold value until it next exceeds the first threshold value is within the range of the predetermined specific time period.

3. A movement detection device comprising:
    an acceleration detection unit configured to detect each respective acceleration component of acting acceleration in each axis of a three-dimensional orthogonal coordinate system and outputs respective acceleration component data;
    a splitting unit configured to split the respective acceleration component data output from the acceleration detection unit into a stationary component obtained by low-pass filter processing and a movement component that is the respective acceleration component data from which the respective stationary component has been removed; and
    a gravitational axis determination unit configured to determine which one of the axes is the gravitational axis corresponding to the direction of gravity, based on the stationary component when the acceleration detection unit has been moved in the direction of gravity with one of the axes facing the direction of gravity;
    wherein the gravitational axis determination unit is further configured to detect that the acceleration detection unit has moved in the direction of gravity and the opposite direction to the direction of gravity when the movement component in the gravitational axis has exceeded a predetermined positive direction first threshold value and a predetermined negative direction second threshold value at least once each alternately within a specific time period.

4. A movement detection method comprising:
    detecting with an acceleration detection unit each respective acceleration component of acceleration acting on the acceleration detection unit for each axis of a three-dimensional orthogonal coordinate system and outputting respective acceleration component data;
    splitting the respective acceleration component data output from the acceleration detection unit into a stationary component obtained by low-pass filter processing and a movement component that is the respective acceleration component data from which the respective stationary component has been removed; and
    detecting which axial direction the acceleration detection unit has moved in for each of the axes based on the movement component indicating a maximum split value, or determining which one of the axes is the gravitational axis corresponding to the direction of gravity, based on the stationary component when the acceleration detection unit has been moved in the direction of gravity with one of the axes facing the direction of gravity.

5. The movement detection method of claim 4, wherein when detecting which axial direction the acceleration detection unit has moved in from each of the axes,
    the acceleration detection unit is detected as having moved in the axial direction corresponding to the movement component indicating the maximum value when the movement detection unit is moved to-and-fro along one of the axial directions if, when the movement component indicating the maximum value first exceeded a predetermined first threshold value, a time period from when the movement component exceeds a predetermined second threshold value until it next exceeds the second threshold value is within a range of a predetermined specific time period, or if, when the movement component indicating the maximum value first exceeded the predetermined second threshold value, a time period from when the movement component exceeds the first threshold value until it next exceeds the first threshold value is within the range of the predetermined specific time period.

6. The movement detection method of claim 4, wherein when determining which axis is the gravitational axis corresponding to the direction of gravity, the acceleration detection unit is detected as having moved in the direction of gravity and the opposite direction to the direction of gravity when the movement component in the gravitational axis has exceeded a predetermined positive direction first threshold value and a predetermined negative direction second threshold value at least once each alternately within a specific time period.

* * * * *